US005880958A

United States Patent [19]

Helms et al.

[11] Patent Number: 5,880,958

[45] Date of Patent: Mar. 9, 1999

[54] METHOD AND APPARATUS FOR FREIGHT TRANSPORTATION USING A SATELLITE NAVIGATION SYSTEM

[75] Inventors: Robert V. Helms, Poway; Jeffrey A. Jacobs, Del Mar, both of Calif.

[73] Assignee: Qualcomm Incorporated, San Diego, Calif.

[21] Appl. No.: 510,020

[22] Filed: Aug. 1, 1995

Related U.S. Application Data

[63] Continuation of Ser. No. 226,783, Apr. 12, 1994, abandoned.

[51] Int. Cl.[6] .................... G06F 17/60

[52] U.S. Cl. .................... 364/436; 364/443; 340/991; 340/993; 340/994

[58] Field of Search .................... 364/436, 443, 364/467, 402, 446, 400, 401 R; 340/993, 994, 991, 825.6; 395/925, 926

[56] References Cited

U.S. PATENT DOCUMENTS

| | | | |
|---|---|---|---|
| 4,092,718 | 5/1978 | Wendt | 364/436 |
| 4,212,069 | 7/1980 | Baumann | 364/467 |
| 4,360,875 | 11/1982 | Behnke | 364/436 |
| 4,791,571 | 12/1988 | Takahashi et al. | 364/436 |
| 4,928,274 | 5/1990 | Gilhousen et al. | 370/92 |
| 4,979,170 | 12/1990 | Gilhousen et al. | 370/104.1 |
| 5,017,926 | 5/1991 | Ames et al. | 342/353 |
| 5,068,656 | 11/1991 | Sutherland | 340/989 |
| 5,122,959 | 6/1992 | Nathanson et al. | 364/436 |
| 5,128,623 | 7/1992 | Gilmore | 328/14 |
| 5,142,278 | 8/1992 | Moallemi et al. | 340/825.06 |
| 5,260,694 | 11/1993 | Remahl | 340/988 |

FOREIGN PATENT DOCUMENTS

| | | | |
|---|---|---|---|
| 2692064 | 6/1992 | France | G08G 1/127 |
| 8904822 | 10/1988 | WIPO | G06F 15/48 |
| 9002129 | 11/1990 | WIPO | H40B 1/00 |
| 9202217 | 11/1992 | WIPO | G01S 5/02 |

OTHER PUBLICATIONS

Riter et al., "Automatic Vehicle Location –An Overview," IEEE Transactions on Vehicular Technology, Feb. 1977, pp. 7–11.

*Primary Examiner*—Kevin J. Teska
*Assistant Examiner*—Thai Phan
*Attorney, Agent, or Firm*—Russell B. Miller; Gregory D. Ogrod

[57] ABSTRACT

A system and method for assigning hauling vehicles to freight loads within a freight transportation system is disclosed herein. The system includes a satellite navigation subsystem for providing vehicle and load position data useable to determine the locations of each hauling vehicle and freight load. The position data may also be utilized to determine a set of deadhead distances required to be traversed by ones of the hauling vehicles unencumbered with freight loads while en route to load pick-up locations. Each unencumbered tractor vehicle is then efficiently matched with an available freight load in accordance with the compiled sets of deadhead distances and a set of potential pick-up times. Objectives such as punctual load pick-up and delivery, full utilization of available tractor vehicles, and maintaining scheduled driver home-base times of arrival may be achieved through "relay" operations. The term "relay" refers to the process by which an in-transit load is disengaged from a first tractor vehicle and made available at a designated relay location. The disengaged load is then engaged by a second tractor vehicle which becomes available in the vicinity of the relay location within a predefined relay window. In a preferred implementation the loads matched to selected pairs of tractor vehicles may also be exchanged, or "swapped", at a set of swap locations so as to minimize a cost function.

30 Claims, 13 Drawing Sheets

TRACTOR UNIT RECORD

| FIELD IDENTIFIER | SIZE | TYPE | FIELD TITLE |
|---|---|---|---|
| VID | 10 | ALPHANUMERIC | TRACTOR IDENTIFIER |
| LOC | 9 | ALPHANUMERIC | CURRENT LOCATION CODE |
| STA | 2 | ALPHABETIC | CURRENT LOCATION STATE ABBREVIATION |
| LAT | 7 | NUMERIC | CURRENT LATITUDE |
| LAD | 1 | ALPHABETIC | CURRENT LATITUDE DIRECTION |
| LON | 7 | NUMERIC | CURRENT LONGITUDE |
| LOD | 1 | ALPHABETIC | CURRENT LONGITUDE DIRECTION |
| LTM | 12 | NUMERIC | TIME OF POSITION REPORT |
| DLC | 9 | ALPHANUMERIC | AVAILABLE AT (DESTINATION) LOCATION CODE |
| DSC | 2 | NUMERIC | AVAILABLE AT (DESTINATION) STATE CODE |
| AVL | 10 | NUMERIC | AVAILABLE AT TIME |
| CTP | 2 | NUMERIC | CAPACITY TYPE |
| PMM | 6 | NUMERIC | MILES SINCE LAST TRACTOR MAINTENANCE |
| ORD | 8 | ALPHANUMERIC | DISPATCHED LOAD NUMBER |
| DSP | 2 | NUMERIC | DISPATCH NUMBER |
| DRV | 10 | CHARACTER | ASSIGNED DRIVER(S) |
| TRL | 10 | CHARACTER | HOOKED TRAILER(S) |
| INC | 1 | CHARACTER | EXCLUDE TRACTOR IN MATCH (Y/N) |
| IES | 1 | CHARACTER | EXCLUDE TRACTOR IN SWAP (Y/N) |
| FPM | 1 | CHARACTER | FORCE TRACTOR TO MOVE (Y/N) |
| PCR | 1 | CHARACTER | TRACTOR CAN BE RELAYED (Y/N) |

FIG. 8

LOAD RECORD

| FIELD IDENTIFIER | SIZE | TYPE | FIELD TITLE |
|---|---|---|---|
| ORD | 8 | ALPHANUMERIC | LOAD NUMBER |
| DSP | 2 | NUMERIC | DISPATCH NUMBER |
| OLC | 9 | ALPHANUMERIC | LOAD ORIGIN LOCATION POSTAL CODE |
| OSC | 2 | ALPHABETIC | LOAD ORIGIN STATE CODE |
| SLC | 9 | ALPHANUMERIC | LOAD SPOT LOCATION POSTAL CODE |
| SSC | 2 | ALPHABETIC | LOAD SPOT LOCATION STATE CODE |
| DLC | 9 | ALPHANUMERIC | LOAD DESTINATION POSTAL LOCATION CODE |
| DSC | 2 | ALPHABETIC | LOAD DESTINATION LOCATION STATE CODE |
| EPT | 10 | NUMERIC | EARLIEST PICKUP TIME (YYMMDDHHMM) |
| LPT | 10 | NUMERIC | LATEST PICKUP TIME (YYMMDDHHMM) |
| EDT | 10 | NUMERIC | EARLIEST DELIVERY TIME (YYMMDDHHMM) |
| LDT | 10 | NUMERIC | LATEST DELIVERY TIME (YYMMDDHHMM) |
| SHP | 10 | ALPHANUMERIC | SHIPPER IDENTIFIER |
| CGN | 10 | ALPHANUMERIC | CONSIGNEE IDENTIFIER |
| STP | 2 | NUMERIC | SHIPPER TYPE |
| CTP | 2 | NUMERIC | CONSIGNEE TYPE |
| TRQ | 2 | NUMERIC | TRAILER TYPE REQUIRED |
| CRQ | 2 | NUMERIC | CAPACITY TYPE REQUIRED |
| PRI | 1 | NUMERIC | CUSTOMER PRIORITY |
| RNU | 4 | NUMERIC | ESTIMATED REVENUE |
| WGT | 5 | NUMERIC | WEIGHT |
| STO | 2 | NUMERIC | NUMBER OF INTERMEDIATE STOPS |
| NDT | 2 | NUMERIC | NUMBER OF DISPATCHES COMPLETED SO FAR |
| RLC | 9 | ALPHANUMERIC | RELAY LOCATION CODE |
| INC | 1 | CHARACTER | INCLUDE/EXCLUDE LOAD IN OPTIMIZATION (Y/N) |
| LMM | 1 | CHARACTER | FORCE LOAD TO MOVE (Y/N) |
| LCR | 1 | CHARACTER | LOAD CAN BE RELAYED (Y/N) |

FIG. 9

DRIVER RECORD

| FIELD IDENTIFIER | SIZE | TYPE | FIELD TITLE |
|---|---|---|---|
| HRO | 4 | NUMERIC | DRIVER HOURS TODAY |
| HR1 | 4 | NUMERIC | DRIVER HOURS TODAY -1 |
| HR2 | 4 | NUMERIC | DRIVER HOURS TODAY -2 |
| HR3 | 4 | NUMERIC | DRIVER HOURS TODAY -3 |
| HR4 | 4 | NUMERIC | DRIVER HOURS TODAY -4 |
| HR5 | 4 | NUMERIC | DRIVER HOURS TODAY -5 |
| HR6 | 4 | NUMERIC | DRIVER HOURS TODAY -6 |
| HR7 | 4 | NUMERIC | DRIVER HOURS TODAY -7 |
| HR8 | 4 | NUMERIC | DRIVER HOURS TODAY -8 |
| HTM | 10 | NUMERIC | TIME DRIVER NEEDS TO BE HOME |
| PRI | 1 | NUMERIC | PRIORITY (TO GET DRIVER HOME) |
| OFF | 3 | NUMERIC | HOURS OFF (ONCE DRIVER IS AT HOME) |
| AMI | 6 | NUMERIC | AVERAGE MILES PER DAY |
| VID | 10 | CHARACTER | ASSIGNED TRACTOR |
| RNK | 1 | NUMERIC | DRIVER RANK |

FIG. 10

TRAILER RECORD

| FIELD IDENTIFIER | SIZE | TYPE | FIELD TITLE |
|---|---|---|---|
| TID | 10 | CHARACTER | TRAILER IDENTIFIER |
| TYP | 1 | CHARACTER | TRAILER TYPE |
| MSM | 6 | CHARACTER | MILES SINCE LAST MAINTENANCE |
| PAV | 5 | CHARACTER | PALLETS AVAILABLE |
| PTP | 3 | CHARACTER | TYPE OF PALLETS AVAILABLE |
| RNK | 1 | NUMERIC | TRAILER RANK |
| VID | 10 | CHARACTER | HOOKED TRACTOR IDENTIFER |

FIG. 11

METHOD AND APPARATUS FOR FREIGHT TRANSPORTATION USING A SATELLITE NAVIGATION SYSTEM

This is a Continuation of application Ser. No. 08/226,783, filed Apr. 12, 1994, which is now abandoned.

BACKGROUND OF THE INVENTION

I. Field of the Invention

The present invention relates to communications systems employing message transmitting stations and Earth orbit relay stations to send messages to mobile vehicles. More specifically, the present invention relates to a novel and improved method and apparatus for utilizing such communications systems to enable efficient assignment of freight hauling vehicles to freight loads within commercial freight transportation systems.

II. Description of the Related Art

A need is recognized by many in the mobile vehicle environment for vehicle location and dispatch messaging capability. One industry in particular in which such information is particularly desirable is the commercial trucking industry. In the commercial trucking industry an efficient and accurate method of vehicle position determination is in demand. With ready access to vehicle location information, the trucking company home base obtains several advantages. The trucking company can keep the customer apprised of location, route and estimated time arrival of payloads. The trucking company can also use vehicle location information together with empirical data on the effectiveness of routing, thereby determining the most economically efficient routing paths and procedures.

As used hereinafter the terms "freight hauling vehicle" and "tractor under load" both refer to a tractor truck, i.e., a "tractor vehicle", to which has been engaged a freight load, i.e., a "load". When the tractor truck and freight load forming a given freight hauling vehicle become disengaged at, for example, a destination or stopover location, the resulting vehicle components will be separately referred to as a "tractor vehicle" and as a "load".

The commercial trucking industry has implemented versatile mobile communication terminals for use in their freight hauling trucks. These terminals are capable of providing two-way communication between the trucking company home base and the truck. Typically the communications are via satellite between the truck and a network communications center or Hub. The trucking company is coupled by conventional means, such as telephone lines, to the Hub.

Using the satellite communication capability at each mobile terminal to provide vehicle position determination offers great advantages to the commercial trucking industry. For example, this capability obviates the need for truck drivers themselves, via telephones, to provide location reports regarding their vehicle position to the trucking company home base. These location reports are intermittent at best, because they occur only when the truck driver has reached a destination or stopover site, and require the expenditure of the driver's time to phone the trucking company home base. This method of location report also leaves room for substantial inaccuracies. For example, truck drivers may report incorrect location information either mistakenly or intentionally; or report inaccurate estimates of times of arrival and departure.

In contrast, the use of satellite communication capability at each truck enables the location trucking company home base to identify the longitude/latitude position of each truck at will, thus avoiding the disadvantages associated with intermittent location reports. For example, the "down time" (i.e., periods of zero revenue production) of idle trucks is minimized since the communications necessary for determining location could take place while trucks are en route. Also, inaccuracies in location reports are virtually eliminated because the trucking company home base is able to ascertain accurate truck location nearly instantaneously.

Although satellite communication systems are well-suited to accurately identify the locations of tractor vehicles and loads, it has heretofore been incumbent upon dispatch operators at the company base station to manually assign individual tractor vehicles to specific loads. In matching tractor vehicles with loads, company dispatch operators typically attempt to minimize the "deadhead" required to be traveled by each tractor vehicle en route to a load rendezvous, or "pick-up", location. The term "deadhead" refers to distance traveled by a tractor vehicle while unencumbered by a trailer load. Deadhead mileage is thus undesirable since it does not generate revenue, yet requires the expenditure of both vehicle and driver resources. Accordingly, at first blush the minimization of deadhead would appear to be a logical criteria to be used by dispatch operators confronted with the task of manually assigning tractor vehicles to loads within a commercial freight transportation system.

However, manual determination of the tractor vehicle assignments resulting in minimum total deadhead mileage is a difficult task even with access to the type of tractor vehicle and trailer position information provided by satellite navigation systems. The process of manual assignment has proven to be particularly complex and time-consuming for relatively large tractor fleets. Moreover, such manual assignment does not easily allow for the modification of existing tractor vehicle assignments based upon the real-time position information provided by satellite navigation systems.

Perhaps more importantly, however, using the minimization of deadhead as the primary criterion in making tractor vehicle assignments will generally not maximize the revenue produced by the tractor fleet. That is, tractor vehicle assignment based on deadhead minimization fails to account for the "down time" during which tractor vehicles remain idle while waiting until an assigned load becomes available. Such "down time" carries with it an opportunity cost equivalent to the revenue which could be produced were the tractor vehicle actually being utilized to deliver a payload. In an effort to minimize deadhead, dispatch operators often delay a tractor vehicle for extended periods of time until a load becomes available at a pick-up location relatively nearby. Unfortunately, dispatch operators are frequently unaware of the opportunity cost (i.e., loss of potential revenue) associated with tractor vehicle down time. Hence, it is clear that the current manual process of determining tractor vehicle assignments on the basis of deadhead information is difficult, and generally will not lead to the most economically efficient matching of tractor vehicles and loads as a consequence of the inadequate consideration given to the opportunity costs associated with idle tractor vehicles.

SUMMARY OF THE INVENTION

In summary, the present invention is directed to a system and method for assigning tractor vehicles to freight loads within a freight transportation system. The system includes a satellite navigation subsystem for providing vehicle and load position data useable to determine the locations of each tractor vehicle and freight load. The position data may also be utilized to determine a set deadhead distances required to be traversed by ones of the tractor vehicles unencumbered with freight loads while en route to load pick-up locations. A multiplicity of potential pick-up times at which ones of the freight loads are to become available for engagement by tractor vehicles at selected pick-up locations is also determined. Each unencumbered tractor vehicle is then efficiently matched with an available freight load in accordance with matching criteria based on, for example, the compiled sets of deadhead distances and potential pick-up times. In addition, the satellite position data may be employed to improve fleet utilization by scheduling reassignment of tractor vehicles currently encumbered with freight loads through calculation of expected time of availability subsequent to load delivery.

Objectives such as punctual load pick-up and delivery, full utilization of available tractor vehicles, and maintaining scheduled driver home-base times of arrival may be achieved through "relay" operations. In accordance with the invention, the term "relay" refers to the process by which an in-transit load is disengaged from a first tractor vehicle and made available at a designated relay location. The disengaged load is then engaged by a second tractor vehicle which becomes available in the vicinity of the relay location within a predefined relay window. Such a relay operation enables, for example, punctual load delivery while simultaneously allowing the driver of the first tractor vehicle to remain in compliance with legally mandated time-off requirements.

In a preferred implementation the loads matched to selected pairs of freight hauling vehicles may also be exchanged, or "swapped", at a set of swap locations so as to minimize a cost function. The cost function will generally be formulated in accordance with selected factors bearing upon the aggregate cost of transporting the plurality of freight loads to the corresponding plurality of destinations. During minimization of a particular cost function tradeoffs are made among parameters such as deadhead distances, scheduled driver arrival time, scheduled equipment maintenance, equipment utilization, and the like in order to optimize a net contribution per freight hauling vehicle over time.

BRIEF DESCRIPTION OF THE DRAWINGS

Additional objects and features of the invention will be more readily apparent from the following detailed description and appended claims when taken in conjunction with the drawings, in which:

FIG. 8 shows an exemplary layout of a tractor status record of a type associated with each tractor vehicle profiled within the tractor vehicle database.

FIG. 9 shows an exemplary layout of a load status record of a type associated with each load profiled within the load database.

FIG. 10 depicts an exemplary layout of a driver status record included within the driver database.

FIG. 11 depicts an exemplary layout of a trailer status record included within the trailer database.

DESCRIPTION OF THE PREFERRED EMBODIMENT

I. Vehicle Tracking Using Satellite Navigation Systems

One method of determining the position of mobile units, such as freight hauling vehicles, is disclosed in U.S. Pat. No. 5,017,926 (the '926 patent), entitled DUAL SATELLITE NAVIGATION SYSTEM, issued May 21, 1991, which is assigned to the assignee of the present invention, and which is herein incorporated by reference. The system of the '926 patent relies upon the theory of trilateration in, for example, the determination of mobile vehicle position. Trilateration prescribes that if the position of three objects are known relative to each other, and the distance from each these three objects to a fourth object is known, then the three dimensional position of the fourth object can be determined within the coordinate frame which described the position of the first three objects.

Trilateration is employed within the system of the '926 patent by first assigning one of the three fixed object locations to the center of the earth. Because the object whose position is to be determined, such as a freight hauling vehicle, is known to travel upon the surface of the earth, standard geodetic planetary models are available to define the distance from the earth's center to any latitude and longitude location on the surface. The second and third object locations are given by two earth orbiting, repeater satellites, whose positions in earth coordinates, if not known are then ascertained. The distance from each of these satellites to the vehicle whose position is to be determined is then ascertained. Once the distance from each respective satellite to the vehicle is known, and given the distance from the vehicle to the center of the earth, i.e., the radius of the earth, the three dimensional position of the object is determined and translated onto the latitude and longitude lines of the earth.

In a preferred implementation, a mobile communications terminal serves as the receiver and transmitter for each tractor vehicle. A fixed ground station is in communication with the mobile communications terminal via a primary satellite. The trucking company home base is capable of communicating with the ground station to complete communications with the mobile communications terminal. Typically it is the trucking company home base that initiates a vehicle position determination. However, the mobile communications terminal itself may initiate a position determination. One such case is when a load becomes detached from the tractor vehicle, at which time the detachment location may be immediately communicated to the trucking company home base. Determination of the location of each tractor vehicle and load at arbitrary times can thus be accurately and instantly determined without requiring tractor vehicle down time.

Figure 1:
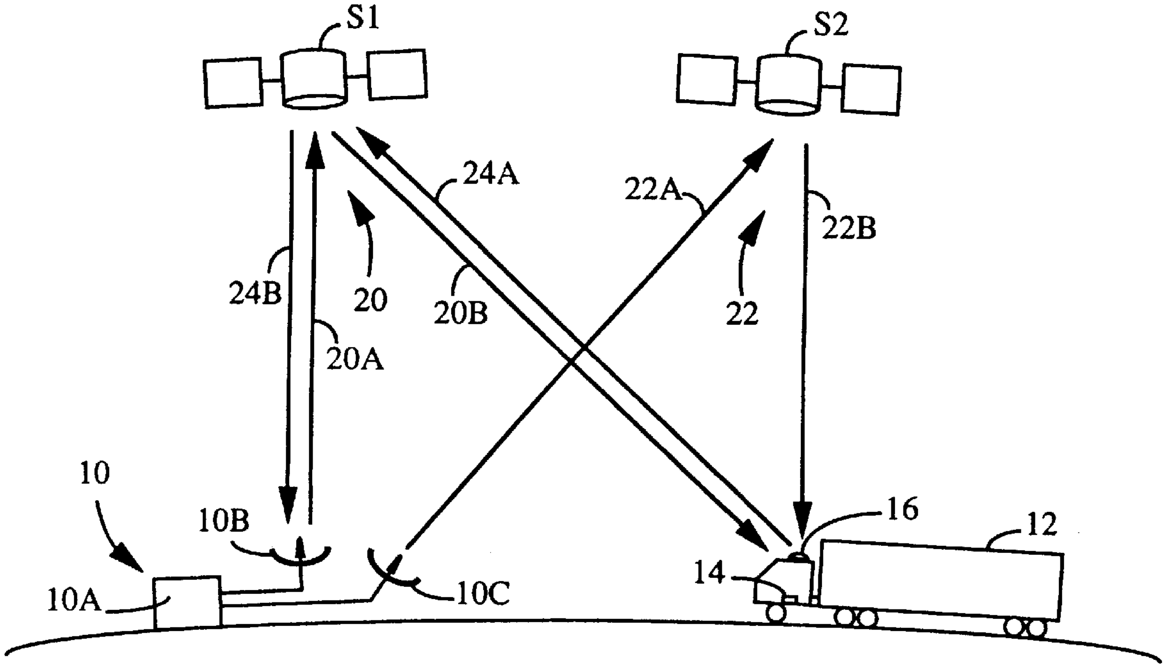
FIG. 1 depicts an exemplary implementation of a satellite navigation system.

The components of the satellite navigation system contemplated by the '926 patent are depicted in FIG. 1. A Hub or fixed ground station 10 in FIG. 1 includes a communications terminal 10*a* which is capable of satellite communications. Terminal 10*a* typically includes a transceiver, an interface to the customer home base and a processor (each not shown).

Fixed station 10 also includes primary antenna 10*b* and secondary antenna 10*c*. Primary antenna 10*b* is in line of sight with primary satellite S1 and is capable of tracking satellite S1. Transmissions on primary antenna 10*b* typically contain digital information modulated on a signal carrier. In a preferred implementation the signal carrier is characterized as an RF signal with sawtooth periodic frequency modulation. Secondary antenna 10*c* is in line of sight with secondary satellite S2 and is capable of tracking satellite S2. Transmissions on secondary antenna 10*c* typically consist of the signal carrier lacking the digital information modulation although the sawtooth periodic modulation remains.

As is described in detail in the '926 patent, determination of the distance between the satellites and the vehicle whose position is to be determined is accomplished by translating radio signal propagation times into distance through which that signal has traversed. As is indicated by FIG. 1, forward signals are transmitted from Hub 10, at antennas 10*b* and 10*c*, via primary satellite S1 and secondary satellite S2 respectively to mobile unit 12. The signal transmitted from antenna 10*b* via satellite S1 to mobile unit 12 is identified as the forward link signal 20 with the uplink and downlink portions thereof being respectively identified by the reference numerals 20*a* and 20*b*. The signal transmitted from antenna 10*c* via satellite S2 to mobile unit 12 is identified as the forward link signal 22 with the uplink and downlink portions thereof being respectively identified by the reference numerals 22*a* and 22*b*. The signal carrier waveforms of forward link signals 20 and 22 are identical and synchronized when generated for transmission.

Mobile communications terminal 14 is capable of transmitting a return link signal 24 via primary satellite S1 to fixed Hub 10. Return signal 24 is comprised of uplink and downlink signal components identified respectively by the reference numerals 24*a* and 24*b*. Return link signal 24 carries information including information indicative of time difference (TD) between forward link signals 20 and 22 at mobile unit 12. The system of the '926 patent also contemplates measurement of the instantaneous round trip delay (RTD) corresponding to round trip time (or distance) for a signal transmitted from fixed station 10 via primary satellite S1 to mobile unit 12, and instantly retransmitted from mobile unit 12 via primary satellite S1 to fixed station 10. The position of mobile communications terminal 14 is then determined based upon the measured RTD and TD values.

Within the Hub 10 encoded message symbols are used to modulate a frequency generator or source such as a Direct Digital synthesizer which creates an FM modulated carrier, at a preselected frequency which is upconverted to the desired EHF band for transmission to the satellites S1 and S2 over forward links 20 and 22. To decrease interference and accommodate a large number of mobile communications terminals at potentially different burst rates, a Time Division Multiplexed (TDM) transmission scheme will preferably be used. Methods and apparatus for generating, transmitting, and controlling TDM signal are well known in the communication art.

The TDM type communication signals transmitted over the forward links 20 and 22 are transmitted to all of the mobile communications terminals within a given geographical zone or region serviced by the satellites S1 and S2. In order to avoid having to configure each mobile communication terminal (e.g., terminal 14) to be capable of extracting specific message information from the entire wide bandwidth satellite downlink signals, terminal selection may be achieved using an addressing technique for TDM communication signals described in U.S. Pat. No. 4,928,274, which is assigned to the assignee of the present invention and is herein incorporated by reference.

At each mobile communication terminal a transceiver is employed to receive and demodulate communication downlink signals 20*b* and 22*b* received from satellites S1 and S2 (FIG. 1). The downlink signals are received by an antenna and transferred through a diplexer into a demodulator (each not shown) for demodulation. The demodulator employs elements known in the art for down-converting the received communication signal to a lower IF frequency level, and then to a symbol frequency level as an encoded symbol stream (i.e., digital message). The digital message may be provided to a vehicle operator using a display unit such as, for example, an LED, LCD, electroluminescent or discharge type element character display. Alternatively, the message may be interfaced to other processing elements, such as a portable computer, or printed out by a hard copy device such as a small thermal printer.

What has been described to this point is the forward communication link, which is capable of delivering messages to a large number of users distributed over a wide geographic area. On the return communication link, one component of which is identified in FIG. 1 by reference numerals 24*a–b,* each mobile terminal will typically be designed to enable short responses to be made to messages received over the forward link. In addition, timing information supplied by each mobile unit transmitting over the return link may be used in determination of the aforementioned round trip delay (RTD). The signal propagation times derived from such measurements of RTD allow determination of the separation between the satellites S1,

S2 and each mobile terminal in the manner described within the '926 patent, previously incorporated herein by reference.

In the system of '926 patent the position of each mobile terminal is determined using a trilateration procedure on the basis of values derived from signal propagation delays. Values corresponding to a round trip propagation of a signal communicated through a transponder of a first satellite and a propagation delay difference of one way signals communicated through the first satellite transponder and transponder of a second satellite are generated and used in computing vehicle position. There is no absolute time markings of any kind required nor reported to determine the time differentiation between the arriving signals. The time differential is computed as a function of phase offset in periodic modulation of the received signals.

Although particular satellite navigation and communication systems have been described herein in order to motivate discussion of the present invention, it is understood that other satellite systems may be employed to communicate messages and to identify mobile terminal positions. One such positioning system is described in U.S. Pat. No. 4,161,730 (the '730 patent). The accuracy of the position estimation is dependent upon the accuracy of a dedicated clock of $10^{-10}$ located at an object (e.g., a vehicle) whose position is to be determined. This system also proposes the use of accurate, space qualified, atomic clock standards aboard various types of orbiting satellites. Unfortunately, the precision hardware required by the system of the '730 patent is relatively expensive, thereby rendering commercial deployment of the system potentially economically infeasible.

II. Manual Assignment of Tractor vehicles to Loads

Although the system of the '926 patent is well-suited to accurately identify the locations of tractor vehicles and loads, as noted above it has heretofore been incumbent upon dispatch operators at the company base station to manually assign individual tractor units to specific loads. Again, company dispatch operators typically attempt to minimize the "deadhead" required to be traveled by each unencumbered tractor vehicle en route to a load rendezvous, or "pick-up", location. Deadhead mileage is thus undesirable since it does not generate revenue, yet requires the expenditure of both vehicle and driver resources.

Figure 2:
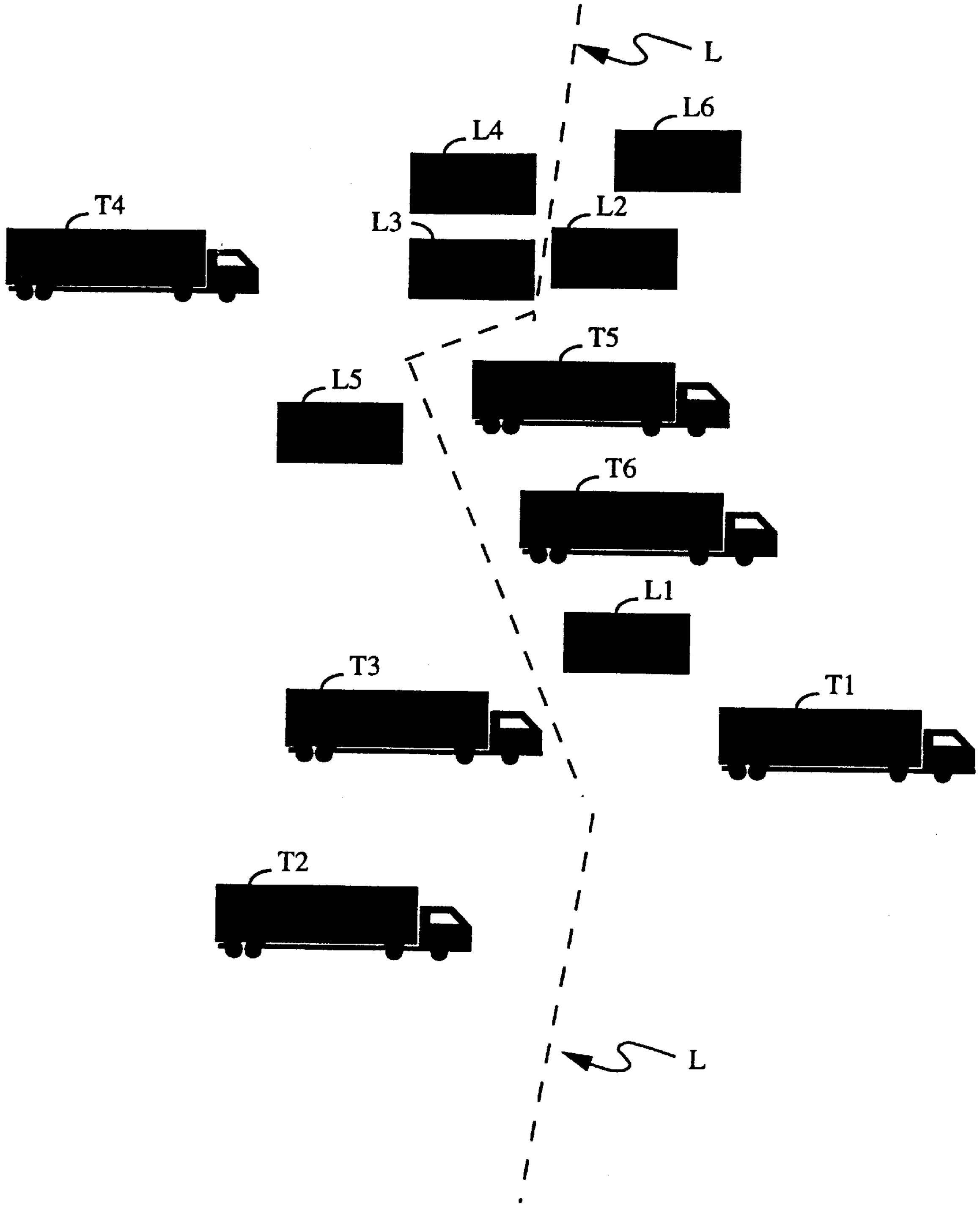
FIG. 2 shows the instantaneous locations of a set of six tractor vehicles (T1–T6) included within a trucking company fleet.

Referring now to FIG. 2, there is shown the instantaneous locations of a set of six tractor vehicles (T1–T6) and loads (L1–L6) included within a trucking company fleet. Each of the tractor vehicles T1–T6 is required to haul one of six loads (L1–L6) available for assignment at various times over the course of a specified interval. In making the required assignments of tractor vehicles to loads a dispatch operator would generally have access to the type of "deadhead" information compiled below in TABLE I. In particular, TABLE I specifies the deadhead mileage separating each of the tractor vehicles T1–T6 from each of the loads L1–L6. It is apparent, however, that with access to the information set forth in TABLE I, manual determination of the tractor vehicle assignments resulting in minimum total deadhead mileage would generally be a painstaking, time-consuming task.

TABLE I

| | T1 | T2 | T3 | T4 | T5 | T6 |
|---|---|---|---|---|---|---|
| L1 | 184 | 188 | 108 | 190 | 101 | 46 |
| L2 | 253 | 283 | 204 | 199 | 34 | 74 |
| L3 | 269 | 265 | 192 | 157 | 33 | 71 |
| L4 | 312 | 320 | 247 | 182 | 68 | 121 |
| L5 | 268 | 218 | 155 | 113 | 90 | 83 |
| L6 | 255 | 303 | 223 | 221 | 59 | 94 |

That is, it would be only with considerable effort that a dispatch operator would be able to determine that the following set of tractor/load matches resulted in minimization of deadhead:

| Tractor | Load |
|---|---|
| T3 | L1 |
| T5 | L2 |
| T6 | L3 |
| T4 | L4 |
| T2 | L5 |
| T1 | L6 |

An alternate manual tractor-to-load assignment technique attempts to simplify the requisite matching process by partitioning the geographic area encompassed by the fleet of available vehicles into a set of two or more regions. Using this technique tractor vehicles are only assigned to loads located within the same region. As an example, partitioning the area of FIG. 2 into first and second regions separated by the dashed line L results in the tractor vehicles T2, T3 and T4, and the loads L3, L4 and L5 being grouped within the first of the two regions. The second region is seen to contain tractor vehicles T1, T5 and T6, and loads L1, L2 and L6. This simplifies the task of making tractor-to-load assignments primarily on the basis of deadhead minimization, since each region only includes three tractor vehicles and three loads. In the example of FIG. 2, the deadhead mileage required to be traversed within each region is minimized by separately assigning tractors to loads within the first and second regions. However, such partitioning techniques will generally be incapable of minimizing overall deadhead, since proximately located tractor vehicles and loads within separate regions (e.g., T3 and L1) are not considered as eligible match candidates. In addition, conventional assignment methods based on geographic partitioning also fail to account for the tractor "down time" mentioned above, and hence will generally not result in the most economically efficient assignment of tractor vehicles to loads.

III. Factors Relating to Efficient Assignment of Tractor vehicles to Loads

As is apparent from the foregoing, deadhead minimization and geographic partitioning are manual fleet assignment techniques which will generally result in economically inefficient pairings of tractor vehicles and loads. In fact, any fleet assignment technique which fails to consider all of the cost/benefit factors associated with the resulting set of assignments is incapable of consistently maximizing a desired function (e.g., fleet revenue) of such cost/benefit factors. That is, minimizing deadhead (i.e., allowing tractor vehicles to remain idle at drop-off locations until other loads become available at or near the drop-off location) necessarily fails to minimize tractor down time, and vice-versa. Accordingly, an economically efficient fleet assignment technique must be capable of making trade-offs among a number of factors in order to yield an optimal set of pairings of tractor vehicles and loads. The following constitutes a partial list of the factors which will generally be pertinent to the process of efficiently matching tractor vehicles and loads within a freight transportation system:

(i) deadhead mileage and down time accrued by each tractor vehicle;

(ii) the maximum number hours, mandated by Department of Transportation regulations, during which a driver may operate a vehicle within a given period of time;

(iii) the availability of the type of tractor and trailer equipment necessary to engage specific loads;

(iv) the timeliness required in pick-up and delivery of loads to particular customers;

(v) the hours of operation at pick-up/delivery locations; and (vi) the costs associated with routing vehicle drivers to destinations requiring layovers away from the driver's residence.

Figure 3:
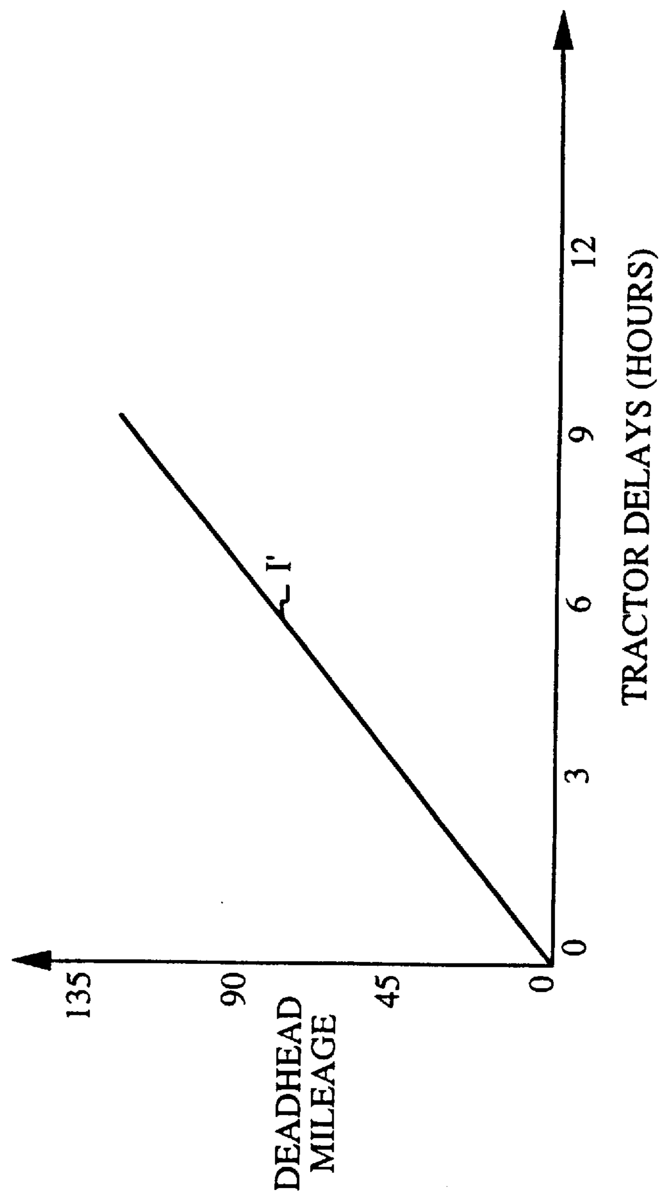
FIG. 3 illustratively represents the relationship between opportunity costs resulting from tractor down time and the costs associated with the accrual of deadhead mileage.
Figure 4:
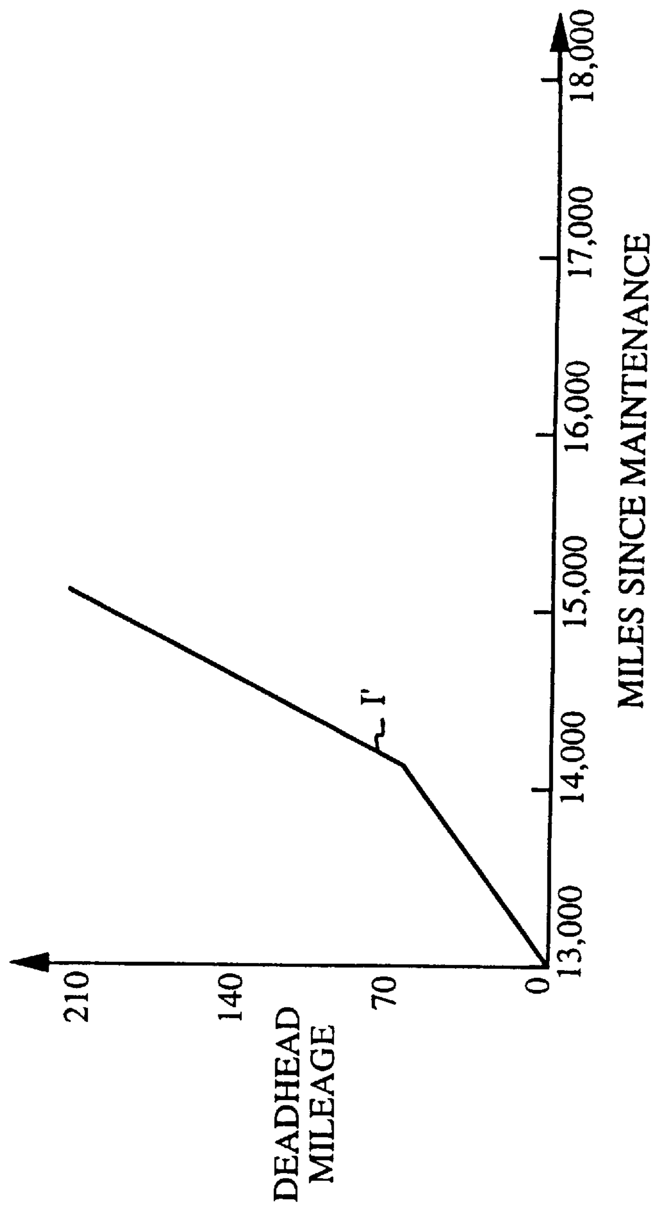
FIG. 4 illustratively represents the tradeoff between the accrual of deadhead mileage relative to continued vehicle operation in the absence of required maintenance.
Figure 5:
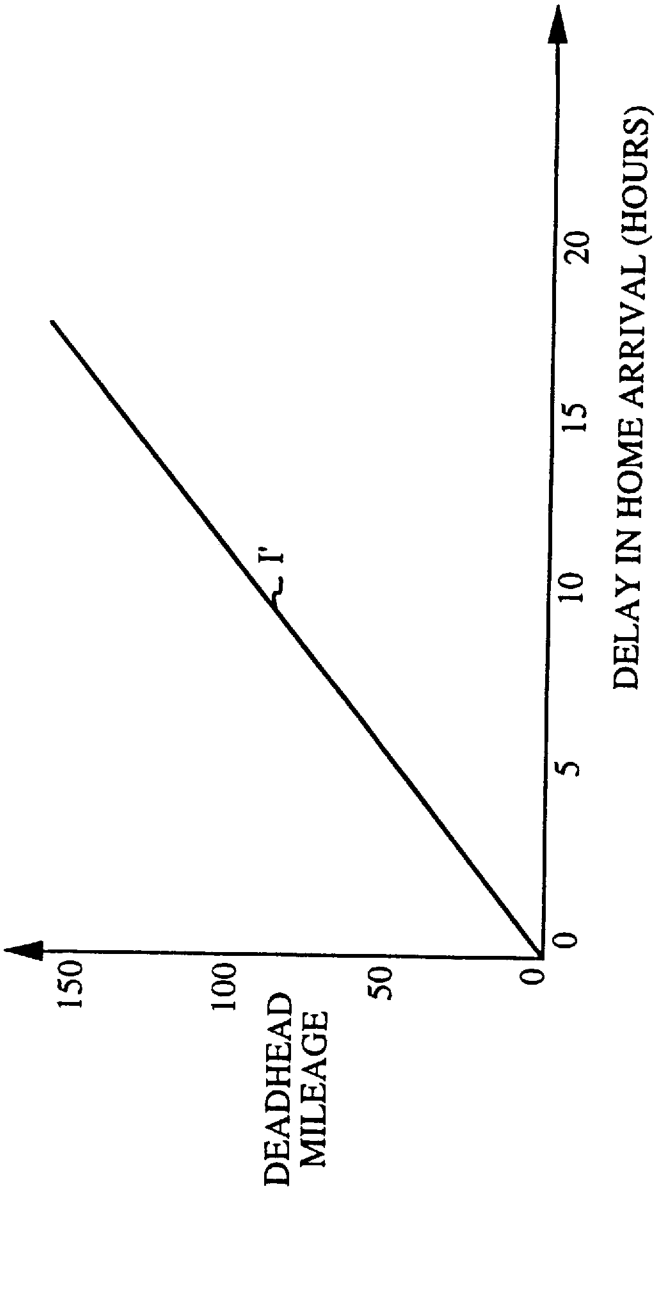
FIG. 5 provides a graphical indication of the number of deadhead miles economically justified to be accrued in transportation of a vehicle driver to his/her residence subsequent to a scheduled time of home arrival.

Turning now to FIGS. 3–5, there are provided graphical representations of the relationships between selected factors bearing upon efficient management of freight transportation fleets. Referring to FIG. 3, there is depicted an "indifference line" (I) indicative of the tradeoff between the opportunity costs (i.e., the loss of revenue-generating capacity) associated with tractor down time and with deadhead mileage. The example of FIG. 3 assumes the existence of opportunity costs of $1 per deadhead mile, and of $15 per hour of down time. Accordingly, the opportunity cost associated with a tractor down time of 3 hours is seen to be approximately equivalent to the opportunity cost of 45 deadhead miles.

In FIG. 4, the indifference line I' is representative of the cost associated with traversal of deadhead mileage to a maintenance facility relative to the cost of continued vehicle operation in the absence of required maintenance. The indifference line I' in FIG. 4 assumes a deadhead mileage cost of $1 per mile, a maintenance penalty cost of $0.07 per mile for vehicle operation between 13,000 and 14,000 miles since a maintenance operation, and a maintenance penalty cost of $0.14 per mile for vehicle operation after logging 14,000 miles since vehicle maintenance was last performed. Accordingly, after 13,000 miles of operation since performance of vehicle maintenance it would be economically efficient to travel up to 70 deadhead miles to obtain scheduled maintenance rather than to log an additional 1,000 revenue-producing miles prior to vehicle servicing.

Referring now to FIG. 5, the indifference line I" is indicative of the number of deadhead miles economically justified to be accrued in transportation of a vehicle driver to his/her residence subsequent to a scheduled time of home arrival. The costs associated with failing to allow a driver to return home at the scheduled time include, for example:

(i) driver abandonment of the loaded vehicle prior to payload delivery, and (ii) increased driver turnover within the fleet as a consequence of repeated late arrivals at home.

In the exemplary representation of FIG. 5 it is again assumed that the cost of deadhead mileage is $1 per mile, and that the cost of driver arrival at home after the scheduled time is approximately $10 per hour. Under these assumptions it would be economically justifiable to allow, for example, the accrual of up to 50 deadhead miles in order to avoid returning a driver home late by more than 5 hours.

It is clear that human dispatch operators will typically be unable to simultaneously consider all factors pertinent to transportation cost, such as those described with reference to FIGS. 3–5, during the process of assigning vehicles within a given fleet to a set of loads requiring transport. In addition, however, in order to avoid costly delays and route detours it is further necessary that dispatch operators consider regulatory constraints such as permit requirements, vehicle maintenance, geographic restrictions with respect to equipment type, driver rest periods, and so forth. Moreover, factors pertinent to optimal vehicle utilization will often vary as a function of updated vehicle and load status information received by dispatch operators via satellite, thereby further complicating the task of efficient fleet assignment.

IV. Matching of Tractor vehicles to Loads Using Satellite Navigation Data

Figure 6:
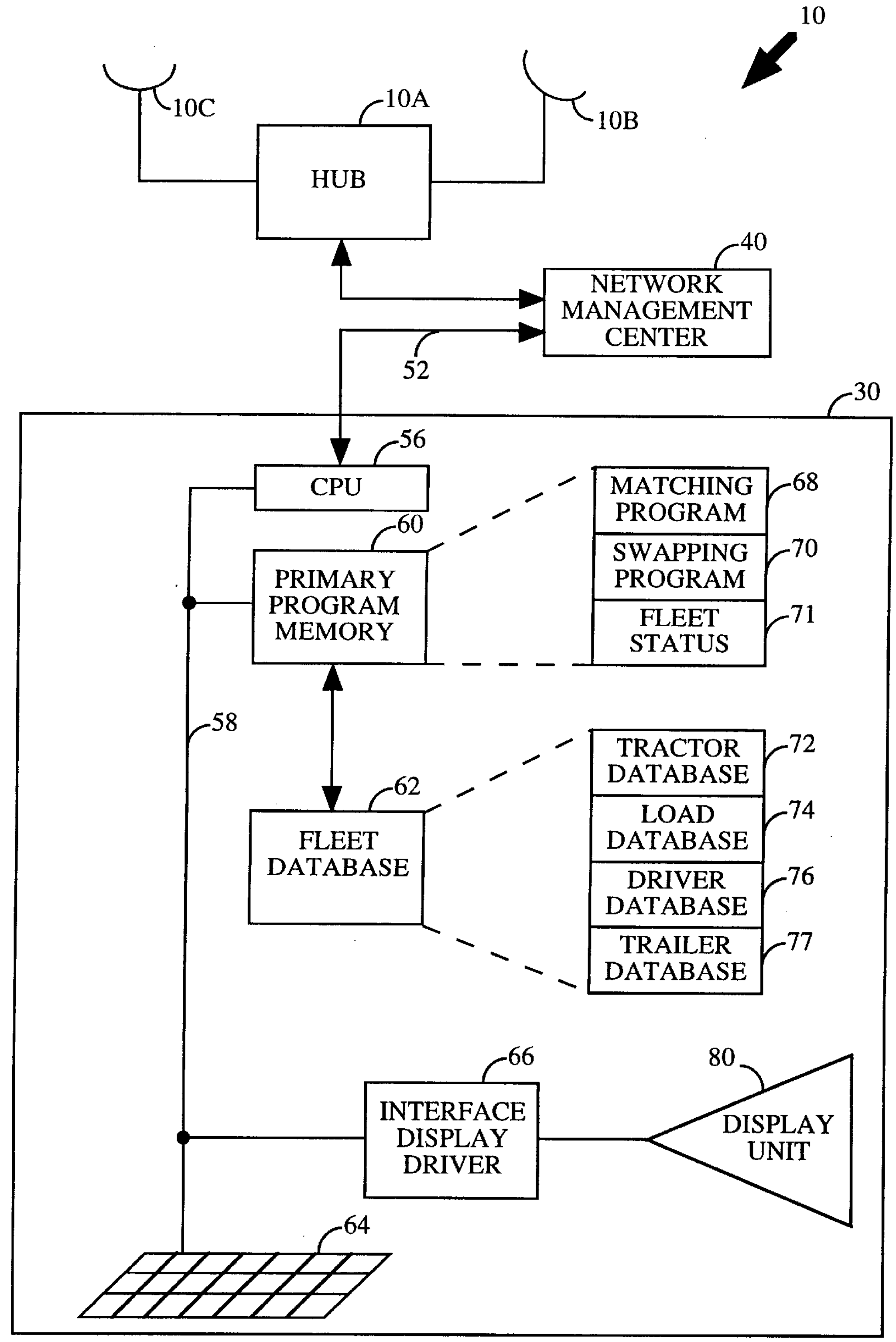
FIG. 6 is a block diagram of a network management center and customer dispatch facility configured in accordance with the invention to process fleet status information received from a satellite navigation system at a terrestrial communications Hub.

FIG. 6 provides a block diagram representation of a network management center 40 and customer dispatch facility 30 configured in accordance with the invention to process fleet status information received from the Hub 10. Messages transmitted to and from the mobile communication terminals mounted upon each vehicle within the customer fleet are received via satellite by the Hub 10. The Hub 10 may be placed at a location such as a trucking terminal or central dispatch office, thereby facilitating maintenance and system upgrade by allowing for direct local access to transmission equipment. Alternately, the Hub 10 is located in a remote location more ideally suited for low interference ground-to-satellite transmission or reception. In this case, one or more system user facilities in the form of central dispatch offices, message centers, or communications offices 30 are tied through telephonic, optical, satellite, or other dedicated communication link to the Hub 10. In addition, for large numbers of remote customer message centers, a network management center 40 can be employed to more efficiently control the priority, access, accounting and transfer characteristics of message data.

The fleet status information conveyed via satellite to the Hub 10 will generally include data related to tractor parameters such as current location, destination, expected time of availability, trailer type, capacity type, and so forth. Similarly, the received status information pertinent to unassigned loads and drivers will typically specify, for example, an originating load location, a final destination, a load pick-up time window, number of intermediate stops en route to a final destination, scheduled driver home arrival, driver hours worked, and the like. In an exemplary embodiment the following fleet status information is also received at the Hub 10:

(i) acknowledgment that a given tractor vehicle has accepted a dispatch assignment, and hence that loading of the trailer attached to the tractor vehicle is ready to begin;

(ii) notification of the arrival of a tractor vehicle at a shipper location;

(iii) the existence of a "bumped at pick-up dock" condition in which a tractor vehicle has arrived at a specified pick-up location and that loading of the trailer has begun;

(iv) notification via a "departing shipper" message that a particular tractor vehicle has engaged a specified load and is enroute to a drop-off location;

(v) notification of the arrival of a freight hauling vehicle (i.e., a tractor engaged to a load) at a consignee drop-off location;

(vi) the existence of a "bumped at drop-off dock" condition in which a freight hauling vehicle has arrived at a specified drop-off location and has begun to unload in order to complete delivery;

(vii) notification that a tractor vehicle is "empty" upon completing load delivery, and (vii) notification of the time at which an empty tractor vehicle will again become "available" to be assigned to another load ("projected time available").

This fleet status information, and accompanying satellite position data, are utilized in accordance with the present invention to enable real-time determination of load pick-up and delivery times, projected times of tractor vehicle and load availability, and other information of assistance to dispatch operators.

Turning again to FIG. 6, the Hub 10 is connected to the customer dispatch facility 30 by way of the network management center 40 and through a telephone line or dedicated fiber optic cable 52. The customer dispatch facility 30 is seen to include a general purpose computer system having a central processing unit 56 that is interconnected by a system bus 58 to primary program memory 60, to a fleet database 62, to a keyboard 64, and to an interface display driver 66. Stored in primary memory 60 are a fleet matching program 68, a fleet swapping program 70, and fleet status information 71 of the type described above. Similarly, the fleet database 62 is seen to contain tractor, load, driver and trailer databases 72, 74, 76, and 77, the contents of which are described in further detail below with reference to FIGS. 8, 9, 10 and 11. In accordance with the invention, the fleet matching and swapping programs 68 and 70 provide, via an interface display unit 80, information designed to enable dispatch operators to efficiently allocate a fleet of tractor vehicles among a set of loads requiring transportation to various destinations.

In the embodiment of FIG. 6, the fleet matching/swapping programs, the fleet status information, and the fleet database are resident within the memory of a general purpose computer system. For example, the fleet matching/swapping programs may be installed on a dedicated external computer system (e.g., an IBM model RS6000) linked to a fleet database 62 stored within the host computer system of a customer dispatch facility. Results of the tractor to load matching/swapping programs executed by the external computer are then provided to dispatch operators using a display routine resident within the host computer.

Figure 7:
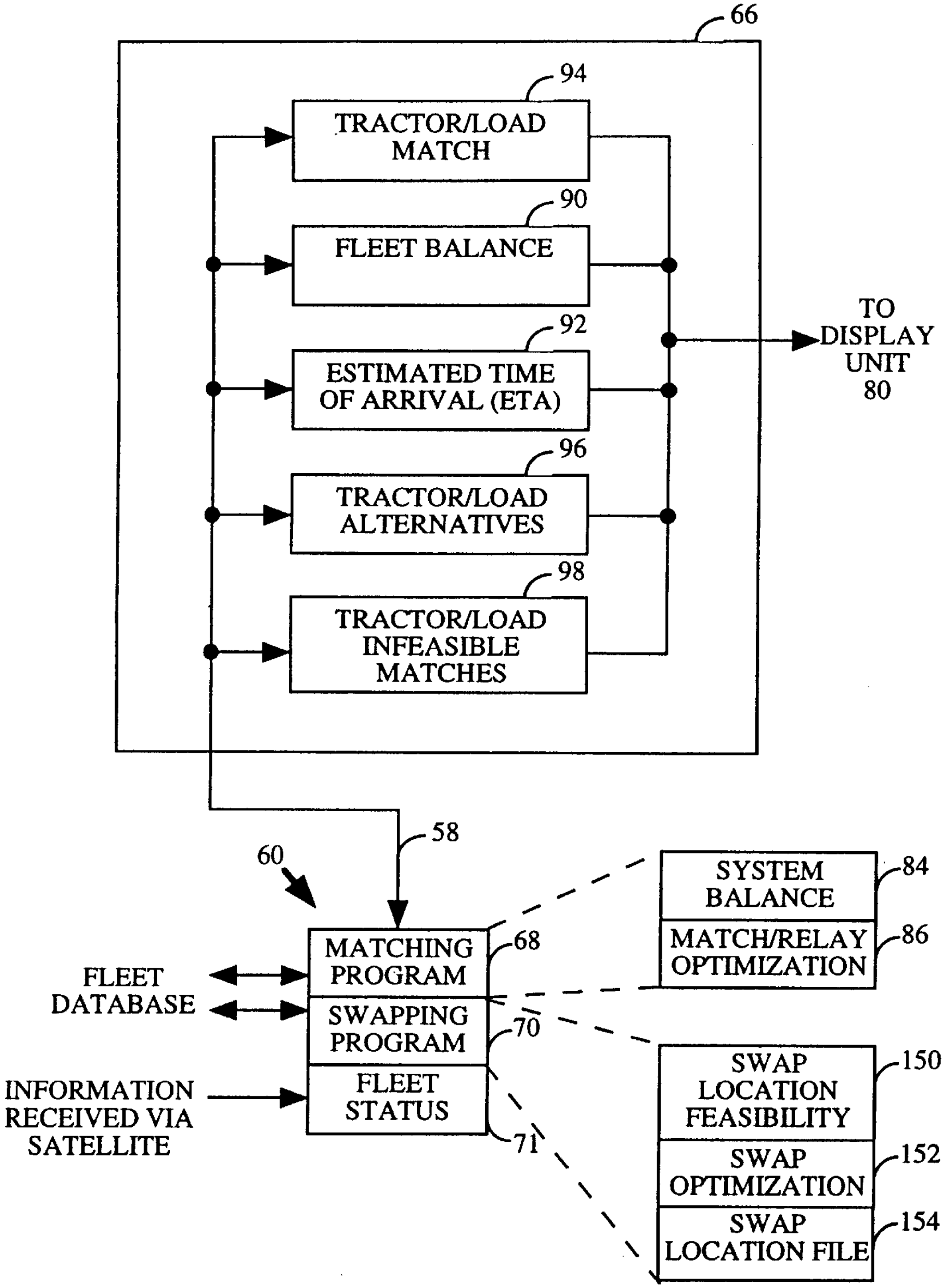
FIG. 7 provides a more detailed view of the organization of a primary memory and interface display driver of a processing system disposed within a customer dispatch facility.

FIG. 7 provides a more detailed view of the organization of the primary program memory 60 and of the interface display driver 66. Referring to FIG. 7, the matching program 68 is seen to be comprised of system balance and match optimization routines 84 and 86. The system balance routine 84 provides, on the basis of fleet status information 71, continuously updated information relating to tractor/load distribution.

Turning now to FIGS. 8 and 9, there are respectively shown exemplary layouts of the tractor and load status records associated with each tractor vehicle and load profiled within the tractor and load databases 72 and 74 of the fleet database 62. Similarly, FIGS. 10 and 11 respectively depict exemplary layouts of driver and trailer status records included within the driver and trailer databases 76 and 77 of the fleet database 62. Again, the information within the various fields of each status record is modified by the system balance routine 84 on the basis of fleet status information received via satellite and on the basis of information provided by dispatch operators. During operation, requests for information relating to fleet balance within particular geographic areas are processed by the system balance routine 84 by, for example:

(i) inspecting the location information stored within each database; and (ii) projecting the time at which each tractor vehicle will again become available for assignment to another load.

The resultant balance information is then furnished to a fleet balance display driver 90 (FIG. 7), which provides the requested balance information to display unit 80 in a specified format. Similarly, system balance routine 84 is capable of computing estimated time of arrivals (ETAs) of loads at specified locations on the basis of, for example, tractor/load instantaneous position, tractor availability, load pick-up time, average tractor vehicle rate of transit, and related information stored within the fleet database 62. The calculated ETAs are output by an ETA display driver 92 (FIG. 7) in a requested format to display unit 80.

The match optimizer routine 86 also utilizes the information compiled within fleet database 62 in generating sets of preferred 94, alternate 96 and infeasible 98 matches between tractor vehicles and loads. However, in order to facilitate understanding of the operation of the match optimization routine 86 the content of each field of the exemplary tractor, load, driver and trailer records depicted in FIGS. 8 and 9 is summarized immediately below. In addition, a set of user-defined constraints relating to execution of the matching/swapping programs 68 and 70 are set forth in Appendix A.

V. Overview of Fleet Database

Description of Fields in Exemplary Tractor vehicle Record (FIG. 8)

Tractor Identifier—Contains the tractor identifier in a 10 character field.

Current Location Code—This field identifies the location of the nearest "landmark" relative to the tractor vehicle in question. In an exemplary embodiment each location code corresponding to a landmark within the United States includes the left justified 9-digit postal (ZIP) code. If 9-digit codes are unavailable, a 5-digit code is entered left justified with the remaining four digits entered as zero. For landmark locations in Canada, the left justified 6-character Canadian postal code is used with the remaining three digits entered as zero. Similar location codes may be developed based on the various postal addressing protocols employed within other countries.

Current Location State/Province/Country Abbreviation—The two character state/province/country code of this field identifies the geographic region of the landmark nearest the specified tractor vehicle.

Current Latitude & Current Latitude Direction—Indicates the last reported latitude of the specified tractor vehicle in degrees, minutes and seconds, and is followed by the latitude direction (ie, E=East, W=West).

Current Latitude & Current Latitude Direction—Indicates the last reported longitude of the specified tractor vehicle in degrees, minutes and seconds, and is followed by the longitude direction (ie., N=North, S=South).

Time of Position Report—This field identifies the date/time that the specified tractor vehicle last reported a geographical position, and in an exemplary embodiment is expressed in YYMMDDHHMMSS format.

Available at (Destination) Postal Code & at State/Province/Country Code—If the specified tractor vehicle is either engaged to a load or accruing "deadhead" mileage en route to an assigned load pick-up location, the location code within this field identifies the corresponding destination. If the tractor vehicle is currently unassigned to a particular load, the current location of the tractor vehicle is specified within this field.

Availability At Time—This field is indicative of the date/time at which the tractor vehicle became available or will become eligible for assignment to another load.

Capacity Type—Indicates the capacity of a currently assigned vehicle unit, where each vehicle unit includes a tractor vehicle, a driver and a tractor trailer.

Miles Since Last Maintenance—The number of miles since maintenance was last performed on a given tractor vehicle is specified by this field.

Tractor Can Relay—The presence of the character "Y" within this field indicates that the specified tractor vehicle is allowed to be "relayed", i.e., a tractor vehicle of like kind may be substituted for the specified tractor vehicle at a relay location. This field is set to "N" to prevent the tractor vehicle from being relayed.

Include/Exclude in Optimization—The inclusion of the character "Y" within this field indicates that the specified tractor vehicle is to be excluded from optimizations performed by the match optimization routine 86. The character "N" indicates that the specified tractor vehicle is to be included in any such optimizations provided that the tractor vehicle is located within the geographical region to be considered by the optimization routine 86.

Include/Exclude in Swap—The presence of the character "Y" within this field causes the tractor vehicle to be excluded from optimizations performed by the swapping program 70. A value of "N" allows the tractor vehicle to be included within such optimization operations.

Force Tractor to Move—The inclusion of the character "Y" within this field forces the matching program 68 to assign a load to the specified tractor vehicle. This field is set to "N" in cases where the tractor vehicle is to remain unassigned if predefined match feasibility criteria is unable to be met.

Dispatched Load Number—This field contains an identification number corresponding to the load currently assigned to the specified tractor vehicle.

Dispatch Number—Included within this field is a number indicative of the particular route segment for which the specified tractor vehicle has been assigned in transporting the load associated with a particular dispatch order. As an example, consider a dispatch order mandating that a load be transported from Los Angeles to New York, with the load being relayed between separate tractor vehicles in Denver and Colorado. In this instance the Los Angeles to Denver segment would be identified as 01, the Denver to Chicago segment as 02, and the Chicago to New York segment as 03.

Assigned Driver(s)—Each 10-character entry within this field identifies a particular driver currently assigned to the specified tractor vehicle.

Hooked Trailer(s)—Each 10-character entry within this field identifies the one or more trailers currently appended to the specified tractor vehicle.

Description of Fields in Exemplary Load Record (FIG. 9)

Load Number—Contains a unique load identifier within a 8 character field.

Dispatch Number—Included within this field is a number indicative of the particular route segment for which the specified load has been dispatched. Again consider an exemplary dispatch order mandating that the specified load be transported from Los Angeles to New York, with the load being relayed between separate tractor vehicles in Denver and Colorado. Upon the load becoming available for dispatch, this field is set to 00. During transportation of the load from Los Angeles to Denver this field would be set to 01, during transportation from Denver to Chicago segment the field would be set to 02, and on the final leg from Chicago to New York segment the field would be set 03.

Load Origin Location Postal Code & Load Origin State/Province/Country Code—These fields identify the location of the nearest "landmark" relative to the origin of the load in question. In an exemplary embodiment each location code corresponding to a landmark within the United States includes the left justified 9-digit postal (ZIP) code. If 9-digit codes are unavailable, a 5-digit code is entered left justified with the remaining four digits entered as zero. For landmark locations in Canada, the left justified 6-character Canadian postal code is used with the remaining three digits entered as zero. Similar location codes may be developed based on the various postal addressing protocols employed within other countries. It is noted that this field is indicative of the original load pick-up point. In circumstances where the load is delivered to a relay location, the "new" pick-up point corresponding to this relay location will not be in agreement with the location specified by this field, and is instead specified in the "Load Spot" field specified below.

Load Spot Location Postal Code & Load Spot State/Province/Country Code—These fields identify the location of an available load that has been delivered to a relay point. A format identical to that described immediately above with reference to the "Load Origin" field will preferably be employed in filling these fields.

Load Destination Location Code & Load Destination State Code—These fields identify the delivery destination of the specified load, and are filled using the format described above with reference to the "Load Origin" field.

Earliest Pickup Time & Latest Pickup Time—These fields define a time window during which the load is available for pick-up from a given shipper, and are specified in YYMMDDHHMM format. In a preferred implementation the matching program 68 accords higher priority to loads associated with pick-up windows which have expired.

Earliest Delivery Time & Latest Delivery Time—These fields define a time window during which the load must be delivered at a destination location, and are specified in YYMMDDHHMM format.

Shipper Identifier—This is a 10-character field which includes an identifier associated with the shipper of the specified load.

Consignee Identifier—This is a 10-character field which includes an identifier associated with the consignee of the specified load.

Shipper Type—This field identifies a file, preferably stored within the fleet database 62, in which are compiled the hours of operation of a particular "type" of shipper. For example, "Type 1" shippers may be open Monday through Friday, from 8 a.m. to 5 p.m. "Type 2" shippers may be open 7 days a week from 8 a.m. to 8 p.m., and so forth. Accordingly, the file specified is not associated with one and only one shipper, but rather specifies the hours of operation of a particular set (i.e., "Type") of shipper. In a preferred implementation the match optimization routine 86 utilizes the data within the Shipper Type file identified by this field in computation of actual pick-up and delivery times. For example, if a tractor vehicle were to arrive at a pick-up location of an above-referenced "Type 1" shipper on Friday at 6 p.m., the optimization routine 86 would set the earliest load pick-up time to the following Monday at 8 a.m., and would make a commensurate adjustment in the earliest possible load delivery time.

Consignee Type—This field identifies a file, preferably stored within the fleet database 62, in which are compiled the hours of operation of a particular "type" of consignee. Each such "Consignee Type" file is organized similarly to the "Shipper Type" files described above.

Trailer Type Requirement—The file identified by this field, preferably stored within the load database 74, specifies the types of trailers capable of transporting a given load. For example, a "Type 1" trailer specification may indicate that the given load requires a 48' trailer. If this field is set to zero the load is assumed to be compatible of with all types of trailers.

Capacity Type Requirement—The Capacity Type file associated with the entry in this field is also preferably stored within the load database 74, and includes information relating to the "capacity" required by a given load. In a preferred implementation capacity type is defined in terms of required characteristics of the driver, tractor vehicle, and/or type of delivery operation. Exemplary types of driver capacity could be specified as "team" (rather than solo driver), "special skill set" or "driver qualified to move hazardous material". With respect to tractor vehicles, capacity type may refer to a specific vehicle model (e.g., a "cab-over"), or could refer to a customer requirement that only certain types of tractor vehicles are qualified to serve within a tractor fleet dedicated to the customer.

Estimated Revenue—This field provides an estimate of the revenue to be accrued in transporting a load from a pick-up to a destination location. If a given load has been relayed from one tractor vehicle to another at a relay location, then the estimated revenue in this field is based on transportation of the load from the relay location to the destination location.

Weight—This field specifies weight of the load. In a preferred implementation the load weight is considered in determining the feasibility of matching tractor vehicles of various power capacity to the specified load.

Intermediate Stops—This field indicates the number of intermediate stops to be made during transportation of the specified load.

Relay Location Code & Relay Location State Code—The information included within the relay location field is indicative of the location at which the load should be relayed. The presence of blanks within this field indicates that the matching program has not established a preferred relay location.

Load Can Relay—This field is set to "Y" in cases where the loads associated with a particular dispatch order are allowed to be relayed. The field is set to "N" in order prevent loads from being relayed.

Include/Exclude in Optimization—This field is set to "Y" if the load is to included in optimizations performed by the matching and swapping programs 68 and 70. It is further noted that in order for the load to be included within such optimizations it is also necessary that the load be included within the specified geographical area selected for optimization, and that the pick-up date/time of the load precedes the beginning of a time window specified within the optimization request.

Force Load to Move—This field is set to "Y" when it is desired to force the matching program 68 to assign a tractor vehicle to the load. The presence of an "N" within this field allows the load to remain unassigned if a feasible tractor vehicle assignment cannot be made.

Description of Fields in Exemplary Driver Record (FIG. 10)

Driver Hours Today
Driver Hours Today −1
o
o
o
Driver Hours Today −8

The entries within the 9 fields identified above specify the number of hours logged by a given driver for the current day, as well as for each of the preceding 8 days. In an exemplary implementation the entries are formatted in units of 1/100 hours, such that an entry of 0850 corresponds to 8½ hours.

Time that Driver Needs to be Home—This field identifies the date and time that the driver is scheduled to arrive at home, and in an exemplary embodiment is specified in the YYMMDHHMM date/time format.

Priority—This field includes an integer within the range of 0 to 9 indicative of the importance that a given driver arrive home at the scheduled time. The integer 0 denotes the lowest priority, and the integer 9 is the highest priority.

Hours Off—Specified within this field is the number of hours which a given driver desires to remain at home prior to again being dispatched.

Average Miles Per Day—The value within this field indicates the average number of miles/day logged by a given driver.

Assigned Tractor—Specified within this field is an identifier corresponding to the tractor vehicle to which the driver is currently assigned. In a preferred implementation a field of blanks is used to denote the availability of a given driver for assignment to a tractor vehicle.

Driver Rank—Included within this field is a value representative of the rank of a given driver with respect to any other drivers assigned to an identical tractor vehicle. In a preferred implementation a value of 0 is indicates that the driver is not currently assigned to a tractor vehicle, while values of 1 and 2 are used to respectively indicate that the driver is either the "primary" or "secondary" driver of the at most two drivers assigned to the tractor vehicle. During execution of the matching and swapping programs 68 and 70, the characteristics of the secondary driver are ignored except that assignment of both primary and secondary drivers to a given tractor vehicle results in the tractor vehicle being classified as being driven by a driver team.

Description of Fields in an Exemplary Trailer Record (FIG. 11)

Trailer Identifier—This 10-character field includes an identifier unique to a particular trailer.

Trailer Type—Included within this field is a coded entry identifying selected characteristics (e.g., length, refrigeration capability) of a particular trailer.

Miles Since Last Maintenance—This value within this field specifies the number of miles logged by the trailer since maintenance was last performed.

Pallets Available—This is a field used to specify the number of pallets which are currently available for use on the trailer.

Type of Pallets—This field includes a coded entry indicative of the type of pallet(s) available on the trailer.

Trailer Rank—The position in which a particular trailer has been "hooked" within a sequence of trailers behind a given tractor vehicle is indicated by the integral value within this field. For example, the first hooked trailer will be assigned the integer "1", the integer "2" will be used to identify the second trailer, and so forth. In a preferred implementation the Trailer Type characteristics of only the first hooked trailer are considered during operation of the matching and swapping programs 68 and 70.

Hooked Tractor Identifier—Specified within this field is an identifier associated with a tractor vehicle to which the trailer is currently hooked. The field will preferably include a set of blanks if the trailer is not engaged to a particular tractor vehicle.

VI. Optimal Matching of Tractor Vehicles and Loads

In a preferred embodiment the system balance 84 and match optimization routines of the matching program 68 are implemented using a commercially available optimization routine such as, for example, EXPERT DISPATCH produced by Integrated Decision Support Corporation of Plano, Texas. It is understood that those skilled in the art will be capable of modifying such commercially available optimization routines to accommodate the data field formats of the exemplary database records of FIGS. 8–11. The fleet matching program 68 is capable of providing, based on the information stored within the fleet database 62, information such as the following to a dispatch operator via an interface display unit 80:

(i) an economically optimal set of tractor/load matches, (ii) alternative sets of tractor/load matches, (iii) geographical tractor/load balance data, (iv) estimated time of arrival (ETA) data calculated based on system status information (e.g., date/time location information, in-transit rate information)

(v) explanations of infeasible tractor/load matches.

In a preferred implementation the economically optimal set of tractor/load matches is determined by optimizing the net revenue generated by each tractor vehicle per day. A first step in determining an economically optimal set of matches involves subtracting the costs associated with each potential match from the gross revenue produced by a particular tractor/load pairing for the day in question. Included among such costs are those described above, e.g., deadhead mileage required, delay in required maintenance, delay in scheduled driver arrival at home, and so forth. Each potential match is then evaluated in terms of applicable assignment constraints such as customer priority, load pick-up and delivery times, shipper and consignee hours of operation, state permit and equipment requirements, as well as maximum allowed deadhead mileage. Such assignment constraints may result in an otherwise economically optimal tractor/load match being listed as infeasible.

This matching procedure may be performed in a "global" manner on the basis of all of the tractors/loads profiled within the fleet database over a selected time frame (e.g., day or week). Alternatively, the match optimization process may encompass only a subset of tractors and loads identified by the dispatch operator. Tractor/load subsets may be specified on the basis of geographical region, commercial market, availability within a given time period, and so forth. Finally, the dispatch operator may further constrain the number of potential tractor/load matches by "forcing" particular tractor vehicles and/or loads to be assigned within a given time, even if such assignment is not otherwise economically justified.

Figure 12:
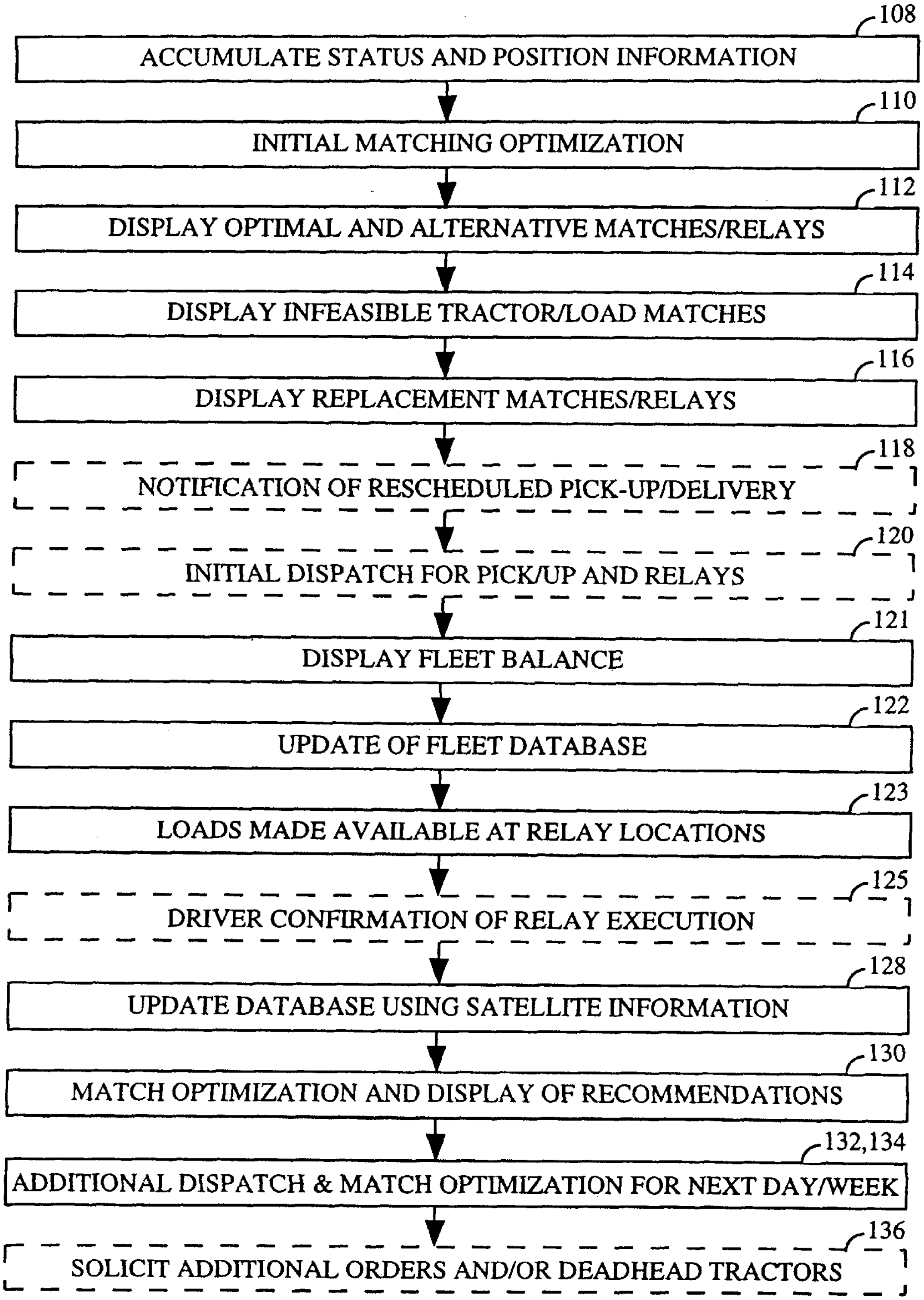
FIG. 12 portrays, by way of a flow chart, a sequence of steps performed during typical operation of the matching program.

FIG. 12 portrays, by way of a flow chart, a sequence of steps likely to be performed during the course of a typical day by the matching program 68 (solid-line boxes), as well as by a dispatch operator (dashed-line boxes). Following the accumulation of fleet status information of the type described above (step 108), an initial tractor/load matching optimization (step 110) will typically be executed at the beginning of each day. The results of this optimization are then provided by matching program 68 to display driver 66, thereby allowing optimal and alternative matches and "relays" to be made available to the dispatch operator (step 112) via display unit 80. In accordance with the invention, the term "relay" refers to the process by which an in-transit load is disengaged from a first tractor vehicle and made available at a designated relay location. The disengaged load is then engaged by a second tractor vehicle which becomes available in the vicinity of the relay location within a predefined relay window (e.g., 48 hours). Such relay operations enable, for example, punctual load delivery while simultaneously allowing for drivers to remain in compliance with legally mandated time-off requirements.

In a specific embodiment a preferred set of matches and relays possessing the following characteristics are made available to the dispatch operator via display unit 80:

(i) economically optimal tractor/load matches and relays, (ii) matches and relays resulting in maximum net revenue per tractor vehicle, (iii) matches resulting in infeasible times of pick-up or delivery, and (iv) matches and relays resulting in minimum aggregate deadhead mileage accrual.

In addition, explanations are given for each infeasible tractor/load match (step 114). As an example, a match may be deemed infeasible if the scheduled tractor vehicle "cannot make load pick-up on time", or "cannot make delivery on time". Matches initially determined to be optimal may subsequently become infeasible as a consequence of accident, equipment failure, adverse road conditions, unexpected delays at pick-up/delivery locations, and the like. Such information bearing upon match feasibility is received via satellite and stored within the fleet database 62, where it is made available to the matching program 68. When such status information indicates that previously recommended matches have become infeasible, replacement sets of optimal and alternative tractor/load matches are generated and displayed (step 116). This enables the dispatch operator to immediately reassign a tractor vehicle to cover each infeasible pick-up or delivery, and also allows each affected shipper or consignee to be notified of the rescheduled appointment time (step 118). After a set of tractor/load pairings has been chosen which eliminates infeasible matches and the selected tractor vehicles are dispatched for pick-up and/or relay (step 120), the resultant fleet balance is displayed (step 121).

Throughout the day additional "relays" may be suggested in response to real-time modification (step 122) of the fleet database based on information received via satellite. Objectives such as punctual load pick-up and delivery, full utilization of available tractor vehicles, and maintaining scheduled driver home-base times of arrival may be achieved through relay operations. As an example, consider the case of a first load engaged by a first tractor vehicle which is ahead of schedule (e.g., by 48 hours) en route from New York to Los Angeles, and which is scheduled to pass through Denver. Assume further that:

(i) the driver of the first tractor vehicle lives in Denver; and (ii) the driver is currently scheduled to spend several days off at home in Denver.

If the matching program 68 determines that a second tractor vehicle will be available at or near Denver within 48 hours, a relay will be recommended and the load will be "made available" for relay in Denver upon being disengaged from the first tractor vehicle (step 123). Upon engaging the first load in Denver, the driver of the second tractor vehicle confirms the execution of the relay operation (step 125). In this way performance of the relay operation in Denver facilitates on-time delivery of the first load in Los Angeles, and also allows the driver to receive the expected time off from duty.

Turning again to FIG. 12, as the day progresses additional fleet status information 71 bearing upon scheduled pick-up and delivery times may be received via satellite (step 128). This allows additional match optimizations to be performed and the recommendations displayed (step 130), thereby enabling the dispatch operator to issue a revised set of dispatch instructions based on the suggested tractor/load assignments (step 132). These steps may be repeated as desired throughout the day in order to take full advantage of real-time modification of the fleet status information 71.

At the end of each day or dispatch shift, a tractor/load matching optimization may be performed (step 134) so as to enable evaluation of fleet balance information over a specified time horizon (e.g., a day or week). Based on the results, additional customer orders may be solicited in areas in which there exists an abundance of tractor vehicles relative to loads (step 136). This allows for improved utilization of available tractor vehicles, thereby increasing fleet revenue. Alternatively, tractor vehicles could be routed "under deadhead" from regions having excess tractor vehicle capacity to areas of lower capacity if this would increase the total net revenue produced by the fleet. This type of fleet redistribution increases net revenue when the resultant improved tractor utilization outweighs the accompanying costs of deadhead transit.

Related to a "relay" is the inventive concept of a "swap", which involves the mutual exchange of the loads associated with two or more in-transit tractor vehicles under load at a swap location. Again referring to FIG. 7, the swapping program 70 includes swap location feasibility and swap optimization routines 150 and 152. In addition, the swapping program 70 has access to the contents of a swap location file 154. Specified within the swap location file 154 are a set of potential swap points, dispersed throughout a geographic area of interest (e.g., the continental United States), at which a pair of tractor vehicles could temporarily become parked while exchanging loads. Each potential swap point will typically exist proximate a highway thoroughfare used by freight hauling vehicles, and hence will often correspond to a highway interchange, a service station, company freight yard, or similar type of location.

The swap location feasibility routine 150 periodically processes the current information within the tractor and load databases 72 and 74, as well as the fleet status information 71, in order to estimate the time of arrival of each in-transit (i.e., non-idle) tractor vehicle under load at selected locations within the swap location file 154. A set of feasible swap locations is then ascertained by identifying those potential swap locations through which two or more tractors under load will pass within a user-defined time window (e.g., 2 hours). The swap optimization routine 154 then determines an economically optimal set of load swaps (i.e., exchanges) at the feasible swap locations identified by the swap location feasibility routine 150. A process substantially identical to that employed by the matching optimization routine 86 is utilized by the swap optimization routine 152 in arriving at a preferred set of load exchanges between in-transit freight hauling vehicles. However, only tractors under load and the set of feasible swap locations are considered as eligible for evaluation within the context of the swapping program 70.

Figure 13:
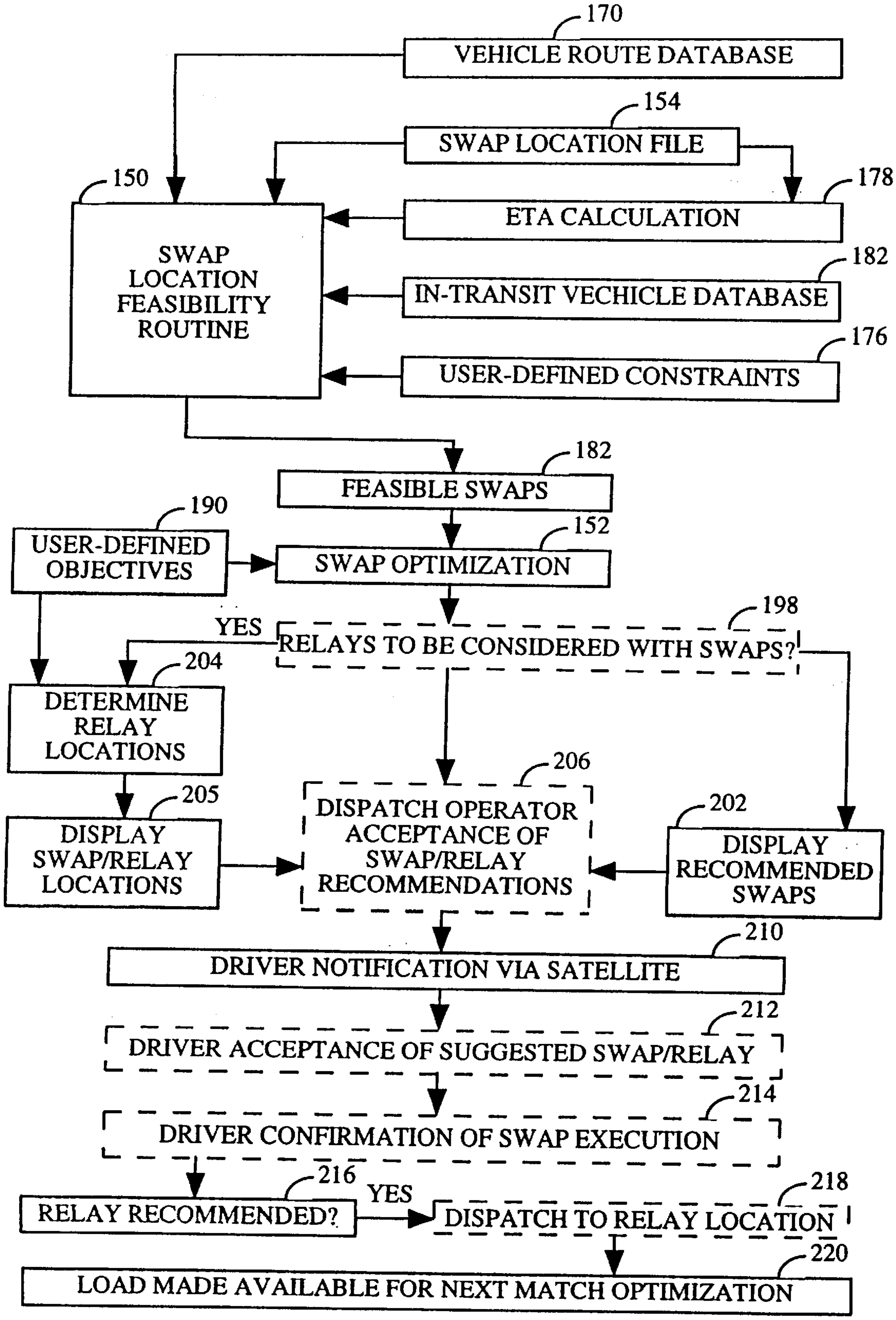
FIG. 13 is a block diagram representative of the structure and operation of the swapping program.

FIG. 13 is a block diagram useful for providing a more detailed representation of the structure and operation of the swapping program 70. Again, actions taken by drivers or dispatch operators are identified by dashed boxes, and processing operations are identified by solid boxes. As is indicated by FIG. 13, the swap location feasibility routine 150 is provided with highway map information stored within a vehicle route database 170. In a preferred implementation the route information stored within the database 170 identifies origin, destination, and intermediate route locations for each vehicle profiled within an in-transit vehicle database 174. The in-transit vehicle database 174 specifies which tractor vehicles under load are currently en-route, and includes time-stamped position and transit rate information for each. That is, the database 174 includes the most recent position and transit rate information obtained via satellite from each in-transit vehicle. In an exemplary embodiment each in-transit vehicle is polled for such information at regular intervals (e.g., once each hour).

Referring again to FIG. 13, an estimated time of arrival (ETA) routine 178 is disposed to calculate the ETA of in-transit freight hauling vehicles to potential swap locations on the basis of the information within the swap location file 154 and within the database 174. Those potential swap locations through which two or more in-transit freight hauling vehicles will pass within a user-defined swap time window, e.g., 2 hours, correspond to a set of locations at which load swaps could potentially occur. Additional user-defined swap constraints 176, other than the user-defined time window, result in the initial set of potential load swaps being narrowed to a set of feasible swaps 182. In an exemplary embodiment the following are included among such additional swap constraints:

(i) maintaining on-time pick-up and delivery, and (ii) ensuring compliance with legally mandated weight and permit requirements.

For example, certain potential swaps may be deemed infeasible if one of the vehicles resulting from the load exchange exceeds applicable weight restrictions. Similarly, a potential swap location could be considered infeasible if execution of the specified swap would result in late delivery of one of the loads involved.

Although all of the feasible swaps 182 are representative of potential load exchanges between in-transit vehicles, the application of other user-defined objectives 190 may result in certain feasible swaps being deemed preferable to other swaps. For example, if a higher priority is placed upon allowing drivers to receive scheduled time-off than is placed upon ensuring that tractor vehicles promptly receive scheduled maintenance, a swap location which provides for the former will be preferred relative to a swap location which does not. Similarly, selected consignees may offer economic incentives for early load delivery. In this case those potential swaps facilitating delivery ahead of schedule to such consignees will be preferred relative to those potential swaps which do not.

Again referring to FIG. 13, a swap optimization routine 192 serves to evaluate the feasible swaps 182 in light of such user-defined objectives 190 so as to generate a set of recommended swaps. If a user (e.g., a dispatch operator) specifies that load relays are not to be performed subsequent to a given load swap operation (step 198), then the swap recommendations developed during the swap optimization routine 194 are displayed (step 202). On the other hand, if it has been specified that relays may be suggested in conjunction with swap recommendations (step 198), then a relay subroutine 204 is executed. In a preferred embodiment the relay subroutine will recommend relays between two or more in-transit freight hauling vehicles, at least one of which has been involved in a swap operation, if such a relay would be of value by increasing net revenue or decreasing net transportation cost. The recommended swap-relay combinations are then displayed to the dispatch operator (step 205). Upon dispatch operator acceptance of the swap and/or swap-relay recommendations (step 206), the drivers of the vehicles specified by the swap and/or swap-relay recommendations are notified via satellite (step 210). Each swap operation must be accepted by the drivers involved (step 212), and is concluded upon driver confirmation of the execution of the swap (step 214).

If a relay has been recommended (step 216) in conjunction with a swap, the driver is dispatched to the relay location following completion of the swap (step 218). The load deposited at the relay location is then deemed "available" (step 220) for assignment to another tractor vehicle during the next iteration of the match optimization routine.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

APPENDIX A

| Parameter | Parameter Definition |
|---|---|
| Maximum Alternatives Generated | Specifies that the maximum number of match/swap/relay recommendations to be displayed. |
| Maximum Out of Relay Miles | Indicates maximum mileage deviation (e.g. 100 miles) of in-transit tractor from scheduled routing which is permitted to occur in order to ensure arrival at a relay location. |
| Maximum Weight | Specifies that maximum weight of each tractor vehicle (i.e., tractor vehicle engaged to load). |
| Swap/Relay Improvement Threshold | This parameter corresponds to the net increase in revenue production or net cost decrease (e.g., $100) which must be attained in order for a particular swap/relay to be recommended. |
| Relay After Swap (Yes/No) | Yes - Allows a relay to be recommended in conjunction with a swap. No - Relays will not be recommended in conjunction with suggested swaps. |
| Window | Specifies the maximum time during which a tractor under load will be allowed to wait at a swap location for a swap opportunity. |
| Swap Lead Time | Indicates the amount of time required by a dispatch operator to coordinate a swap operation among the drivers involved (e.g. 1.5 hrs.). Swaps will not be recommended if insufficient time exists for such coordination. |
| Cutoff Time | Limits the time period in which position information received via satellite is allowed to be used in computing pick-up ETA, delivery ETA, and so forth. |
| Time Remaining to Delivery | Prevents loads from being swapped when less than the specified time remains prior to delivery of at least one of the loads to be swapped. |
| Minimum Relay Move Miles | Sets a minimum mileage threshold required to be traversed by each load between recommended relay locations. |

What is claimed is:

1. A method for assigning each of a set of freight hauling tractor vehicles to one of a set of towable freight loads, said method comprising the steps of:

determining locations of said tractor vehicles and said towable freight loads becoming disengaged from said tractor vehicles, and using said locations to estimate a set of deadhead distances corresponding to separation between each of said tractor vehicles available to engage loads and each of said towable freight loads;

assigning each of said available tractor vehicles with one of said towable freight loads by minimizing a cost function related to a set of revenue parameters, said set of revenue parameters comprising said deadhead distances; and scheduling a relay, in accordance with said cost function, of one of said towable freight loads previously disengaged from a first of said tractor vehicles to a second of said tractor vehicles.

2. The method of claim 1 wherein said step of estimating a set of deadhead distances includes the step of receiving position data relating to locations of said tractor vehicles and to pick-up locations of said freight loads from a satellite navigation system.

3. The method of claim 2 wherein said assigning step includes the step of optimizing revenue parameters associated with said tractor vehicles in accordance with assignment criteria, said set of revenue parameters comprising of:

a down time during which idle ones of said tractor vehicles are disengaged from said freight loads, and deadhead distances traversed by said idle ones of said tractor vehicles en route to said pick-up locations.

4. The method of claim 1 further including the step of relaying one of said towable freight loads from a first tractor vehicle to a second tractor vehicle at a relay location.

5. In a freight transportation system including a set of tractor vehicles and a set of towable trailers each capable of bearing a freight load, a system for assigning each of a set of tractor vehicles to one of a set of trailers, said system comprising:

means for determining locations of said tractor vehicles and of said trailers, said locations being usable to estimate a set of deadhead distances corresponding to separation between said tractor vehicles and said trailers;

means for determining a multiplicity of pick-up times at which ones of said trailers, become available to be engaged by one of said tractor vehicles subsequent to disengagement by another of said tractor vehicles;

means for assigning each of said available tractor vehicles with one of said trailers, by optimizing a cost function related to a set of revenue parameters, said set of revenue parameters comprising said deadhead distances and down time corresponding to periods during which idle ones of said tractor vehicles are disengaged from said trailers, said down time being estimated based on said multiplicity of pick-up times.

6. The system of claim 5 further including a satellite navigation system disposed to provide position data useable to determine said locations of said tractor vehicles and to identify a set of pick-up locations at which are disposed said available trailers.

7. The system of claim 6 wherein said means for assigning includes a processor unit for optimizing a set of revenue parameters associated with said tractor vehicles in accordance with assignment criteria, said set of revenue parameters comprising:

said down time; and deadhead distances traversed by said idle ones of said tractor vehicles en route to said pick-up locations.

8. The system of claim 6 wherein said means for assigning includes means for determining system balance information relating to distribution of said tractor vehicles and to distribution of said available ones of said trailers within one or more geographic areas.

9. The system of claim 8 further including means for modifying said system balance information on the basis of said position data from said satellite navigation system.

10. The system of claim 6 wherein said means for assigning includes means for determining estimated times of arrival of selected ones of said tractor vehicles at selected ones of said pick-up locations.

11. The system of claim 10 wherein said means for assigning includes means for modifying said estimated times of arrival on the basis of said position data from said satellite navigation system.

12. The system of claim 6 further including a processor unit for storing information relating to attributes of said tractor vehicles and of said trailers.

13. The system of claim 12 wherein said means for assigning includes means for specifying a set of feasible matches of said tractor vehicles to available ones of said trailers wherein the tractor vehicle and the trailer associated with each of said feasible matches possess compatible sets of said attributes.

14. The system of claim 13 wherein said means for assigning includes means for specifying a set of infeasible matches of said tractor vehicles to available ones of said trailers wherein the tractor vehicle and the trailer associated with each of said infeasible matches share at least one incompatible one of said attributes.

15. The system of claim 14 wherein said attributes of said trailers required capacity, required trailer type, load destination and scheduled delivery time.

16. The system of claim 15 wherein said attributes of said tractor vehicles include capacity type, type of engaged trailer, vehicle destination and estimated time of vehicle availability.

17. The system of claim 5 further including means for relaying one of said trailers from a first tractor vehicle to a second tractor vehicle at a relay location.

18. In a freight transportation system, a method for assigning a set of tractor vehicles to a plurality of towable freight loads, said tractor vehicles being used to transport said plurality of towable freight loads to a corresponding plurality of destinations, said method comprising the steps of:

determining locations of each of said tractor vehicles, and of each of said towable freight loads becoming disengaged from one of said tractor vehicles, in accordance with vehicle and load position data provided by a satellite navigation system;

assigning based on said locations of each of said tractor vehicles and of each of said freight loads, each of said tractor vehicles to one of said towable freight loads so as to minimize a cost function related to a set of revenue parameters, said set of revenue parameters comprising a down time during which idle one of tractor vehicles are disengaged from said towable freight loads; and scheduling swapping of said ones of said towable freight loads so as to minimize said cost function.

19. The method of claim 18 further including the step of identifying potential swaps between said trailers by calculating estimated times of arrival of said tractor vehicles at said plurality of swap locations.

20. The method of claim 19 further including the step of identifying said plurality of swap locations by determining time windows, based upon said tractor vehicle and trailer position data, during which pairs of said trailers will be located proximate to ones of said potential swap locations.

21. The method of claim 18 wherein said cost function is at least partly based upon capacity of said trailers.

22. The method of claim 18 wherein said cost function is at least partly dependent upon driver attributes of vehicle operators associated with each of said tractor vehicles.

23. The method of claim 22 wherein the driver attributes of each vehicle operator include:

time spent operating ones of said tractor vehicles during a predefined time interval, a home base destination, and a desired time of arrival at said home base destination.

24. A dispatch system for assigning a set of tractor vehicles to a plurality of towable freight loads, said plurality of towable freight loads being transported to a plurality of destinations by said set of tractor vehicles, said dispatch system comprising:

a satellite navigation subsystem for providing vehicle and load position data usable to determine locations of each of said tractor vehicles and said towable freight loads becoming disengaged from said tractor vehicles;

means for assigning each of said tractor vehicles to one of said towable freight loads based on said locations so as to minimize a cost function related to a set of revenue parameters, said set of revenue parameters comprising a down time during which idle ones of tractor vehicles are disengaged from said towable freight loads; and means for scheduling swapping of pairs of said ones of said towable freight loads assigned to said selected pairs of said tractor vehicles so as to minimize said cost function.

25. The system of claim 24 further including means for identifying potential swaps between said towable freight loads by calculating estimated times of arrival of said tractor vehicles at said plurality of swap locations.

26. The system of claim 25 further including means for identifying said plurality of swap locations by determining time windows, based upon said vehicle and load position data, during which pairs of said towable freight loads will be located proximate to ones of said potential swap locations.

27. The system of claim 24 wherein said cost function is at least partly based upon capacity of said towable freight loads.

28. A method for assigning each of a set of freight hauling tractor vehicles to one of a set of towable freight loads, said method comprising the steps of:

determining locations of said tractor vehicles and said towable freight loads becoming disengaged from said tractor vehicles;

recommending a multiplicity of recommended pick-up times at which ones of said towable freight loads becoming disengaged are available to be relayed from one of said tractor vehicles and engaged by another of said tractor vehicles; and scheduling a relay, at one of said multiplicity of recommended pick-up times, of a selected one of said towable freight loads from a first of said tractor vehicles to a second of said tractor vehicles wherein said relay is scheduled for a relay location selected by minimizing a cost function related to a set of revenue parameters, said set of revenue parameters comprising deadhead distances traversed by said first and second tractor vehicles.

29. The method of claim 28 wherein said step of scheduling said relay further includes the step of estimating a time at which said second tractor vehicle will become disengaged from another of said freight loads, said second tractor vehicle thereby becoming available to engage said selected towable freight load.

30. The method of claim 28 wherein said set of revenue parameters further comprising an estimated time of arrival, subsequent to said relay, of said first and second tractor vehicles at one or more home bases subsequent to said relay.

* * * * *